(12) United States Patent  
Franklin et al.

(10) Patent No.: US 8,176,508 B2  
(45) Date of Patent: May 8, 2012

(54) METHOD AND APPARATUS TO PROVIDE VERIFICATION OF DATA USING A FINGERPRINT

(75) Inventors: David Franklin, Aurora, CO (US); Louis Williamson, Denver, CO (US)

(73) Assignee: Time Warner Cable, Stamford, CT (US)

( * ) Notice: Subject to any disclaimer, the term of this patent is extended or adjusted under 35 U.S.C. 154(b) by 1991 days.

(21) Appl. No.: 10/211,146

(22) Filed: Aug. 2, 2002

(65) Prior Publication Data

US 2004/0025176 A1    Feb. 5, 2004

(51) Int. Cl.
*H04H 20/14*   (2008.01)
*H04H 60/29*   (2008.01)

(52) U.S. Cl. ............... 725/22; 725/146; 725/147

(58) Field of Classification Search ............ 725/22, 725/146, 147
See application file for complete search history.

(56) References Cited

U.S. PATENT DOCUMENTS

| | | | | |
|---|---|---|---|---|
| 5,019,899 A * | 5/1991 | Boles et al. | ............ | 725/22 |
| 5,621,454 A * | 4/1997 | Ellis et al. | ............ | 725/22 |
| 5,761,601 A * | 6/1998 | Nemirofsky et al. | ............ | 725/34 |
| 6,035,177 A * | 3/2000 | Moses et al. | ............ | 725/22 |
| 6,271,879 B1 * | 8/2001 | Overton | ............ | 348/180 |
| 6,388,712 B1 * | 5/2002 | Shinohara et al. | ............ | 348/473 |
| 6,574,594 B2 * | 6/2003 | Pitman et al. | ............ | 704/236 |
| 6,658,073 B1 * | 12/2003 | Grunert | ............ | 375/371 |
| 7,085,613 B2 * | 8/2006 | Pitman et al. | ............ | 700/94 |
| 7,194,752 B1 * | 3/2007 | Kenyon et al. | ............ | 725/22 |
| 7,460,994 B2 * | 12/2008 | Herre et al. | ............ | 704/231 |
| 2001/0046297 A1 * | 11/2001 | Kasai et al. | ............ | 380/211 |
| 2002/0083442 A1 * | 6/2002 | Eldering | ............ | 725/34 |
| 2003/0061287 A1 * | 3/2003 | Yu et al. | ............ | 709/205 |
| 2003/0135853 A1 * | 7/2003 | Goldman et al. | ............ | 725/34 |
| 2005/0149964 A1 * | 7/2005 | Thomas et al. | ............ | 725/9 |
| 2008/0282303 A1 * | 11/2008 | Harkness et al. | ............ | 725/113 |

* cited by examiner

*Primary Examiner* — Brian Pendleton
*Assistant Examiner* — Nnenna Ekpo
(74) *Attorney, Agent, or Firm* — Holland & Hart LLP

(57) ABSTRACT

The present invention verifies the transmission of a data stream, such as an advertisement, to a receiver in a data network, such as a television set in a cable television network. In particular, the present invention develops and stores a data stream fingerprint prior to transmission of the data stream. During transmission of the data stream, a verifier compiles the fingerprint from the transmitted data stream and compares it to the pre-developed and stored fingerprint. If the fingerprint signal characteristics are within predetermined parameters, the transmission is considered successful.

46 Claims, 4 Drawing Sheets

METHOD AND APPARATUS TO PROVIDE VERIFICATION OF DATA USING A FINGERPRINT

FIELD OF THE INVENTION

The present invention relates to data verification and, more particularly, using a fingerprint of digital data to verify transmission accuracy and quality.

BACKGROUND OF THE INVENTION

Digital and analog data transmissions are prevalent in today's society. Digital and analog data transmission occurs in telephone communication, Internet use, cable television, and a host of other mediums. As society becomes more and more reliant on data transmission, it becomes more and more necessary to verify the sent data corresponds to the received data.

While it is important to verify data, generically, sometimes data streams receive substitutions of portions of the stream. By way of non-limiting example, it is known to insert advertisement copy, including digital advertisement copy, into analog and/or digital TV programs. Generally, when inserting the advertisement copy into a TV program, the inserted advertisement is broadcast instead of or over an original advertisement. As is well-known, national broadcasters, such as, NBC, insert national advertisements during the broadcast of a TV program for users to view. The national broadcaster allows certain of these national advertisements to be replaced by local advertisements. Generally, the replaceable national advertisements are preceded by a queue signal that indicates that a local advertisement can preempt the following national advertisement.

If the local TV system has a local advertisement that has been sold and is scheduled for presentation to the local TV subscribers, the occurrence of a queue-signal triggers the fetching of a designated local advertisement copy from advertisement storage. The fetched local advertisement copy replaces the national advertisement in the broadcast for viewing by local TV subscribers. After broadcasting the local advertisement, the local TV system resumes broadcasting the national broadcast.

Thus, especially when the data stream is preempted or overwritten, it would be desirous to provide apparatuses and methods to verify data streams and transmission.

SUMMARY OF THE INVENTION

To attain the advantages of and in accordance with the purpose of the present invention, as embodied and broadly described herein, a method for verification of transmitted data streams is provided. The method comprises storing and/or generating a fingerprint of the data stream to be transmitted. Transmitting the data stream and generating a second fingerprint from the transmitted data stream. The fingerprints are compared and, based on the comparison, an error signal is sent if the comparison fails to match within predetermined parameters.

Other embodiments of the present invention provide an apparatus adapted to verify the transmission of data streams. The apparatus includes at least one memory, at least one fingerprint generator, at least one comparator, and at least one error generator. The memory stores a fingerprint of data to be transmitted. The fingerprint generator generates at least the fingerprint of the transmitted data stream. The comparator compares the stored and generated fingerprints to determine if they match. If they fail to match, the error generator generates an error signal.

Still other embodiments of the present invention include computer software products capable of verification of transmitted data streams. The computer program products comprising a computer usable medium including computer readable code embodied therein for verifying a data stream transmission. The computer usable medium having at least one memory module configured to store at least one previous fingerprint of the data stream and at least one fingerprint generator module configured to generate a fingerprint of a transmitted data stream. At least one comparator module is configured to compare the stored at least one previous fingerprint and the generated fingerprint. If the comparison fails to match, at least one error module is configured to generate an error signal.

The foregoing and other features, utilities and advantages of the invention will be apparent from the following more particular description of a preferred embodiment of the invention as illustrated in the accompanying drawings.

BRIEF DESCRIPTION OF THE DRAWING

The above and other objects and advantages of the present invention will be apparent upon consideration of the following detailed description, taken in conjunction with the accompanying drawings, in which like reference characters refer to like parts throughout, and in which.

DETAILED DESCRIPTION

The present invention will be described with reference to FIGS. 1-4. The present invention can be used as a verification system for various types of digital or analog data streams or transmission. While the present invention is described in relation to an audit or verification of inserted local TV programming in a nationally broadcast TV program, one of skill in the art would recognize on reading the below disclosure that the present invention could be used to audit or verify data streams in a number of systems that transmit digital or analog data, such as, for example, internet transmissions, telecommunication transmissions. Further, the present invention would also find utility in cable transmission systems, such as coax, twisted pair, fiber, or the like; or wireless transmission systems, such cellular systems, satellite systems, bluetooth systems, or the like.

Figure 1:
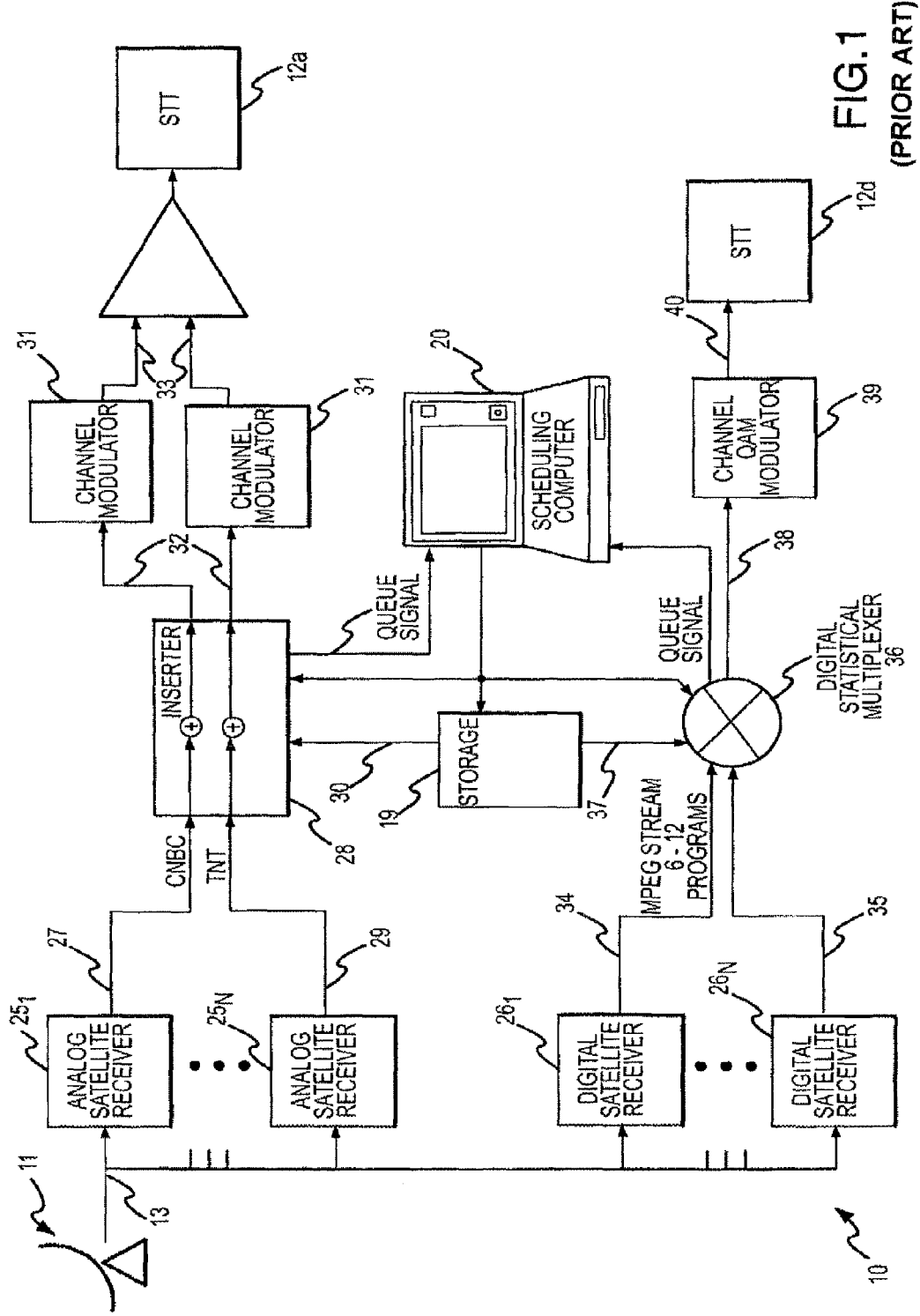
FIG. 1 is an exemplary digital network consistent with aspects of the present invention.

FIG. 1 shows a conventional TV system 10 illustrative of a system that may provide for an audit or verification of presentation of programming to TV viewers. The TV system 10 is described with a set top box installed with a conventional television; however, one of ordinary skill in the art will recognize on reading the disclosure, some conventional televisions do not require set top boxes, or the conventional television could be replaced by other viewing devices, such as a desk-top computer, hand held electronic devices, wireless devices, etc. Further, the present invention will be described with insertion of local advertisements to the programming because it is a common example of when data stream audit or verification if helpful.

FIG. 1 shows an example of the headend and subscriber portions of a conventional analog and digital TV system 10. Typically, TV system 10 includes at least one satellite antenna 11 to receive national broadcasts or programming. While shown as receiving national broadcasts via satellite, other means of broadcast reception are possible, such as tapes, server downloads over a transport network, etc. In this case, the satellite antenna 11 normally is tuned to a particular one of a plurality of satellites (not shown). The antenna 11 has an output connected to provide analog and digital TV services, including interactive services, such as on-demand programs, to subscribers or users connected to system 10. While not necessary, most cable TV systems today use converters or set top boxes (STTs) 12 to receive programming over TV system 10. Thus, STTs 12 represent uses without STTs also. While a large number of antennas 11 and STTs 12 actually exist within system 10, for purposes of convenience only one antenna 11, one analog STT 12a and one digital STT 12d are shown in FIG. 1. In addition, a local-store of TV programming (not shown) is usually provided to provide TV programinput in addition to the output 13 of antenna(s) 11.

Figure 2:
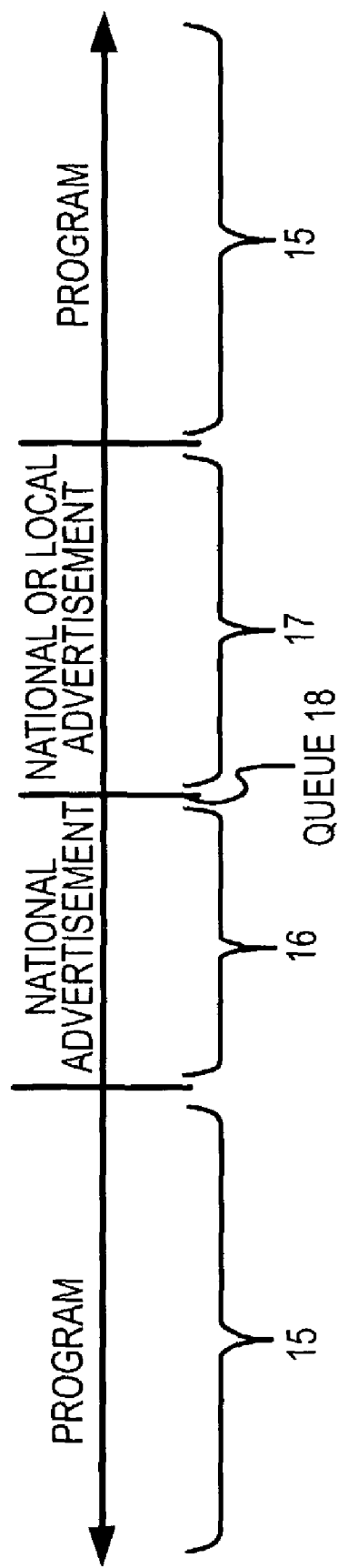
FIG. 2 is an exemplary representation of a digital data transmission consistent with aspects of the present invention.

Output 13 of antenna(s) 13 comprises both analog and digital TV program-content. Typically, the program-content includes preemptable signals and non-preemptable signals. Most preemptable, replaceable, or overwriteble signals are national advertisements. FIG. 2 is a simplified diagrammatic showing of national broadcast signal stream 14 that may be present at the output 13 of antenna 11. Signal stream 14 includes a first relatively long time duration TV program portion 15 that includes both voice (V) and audio (A). TV program portion 15 is followed in time sequence by a first relatively short time duration signal area 16 that contains a first national advertisement that cannot be preempted, and thus will always be viewed by TV users whose STTs 12 are tuned to receive signal stream 14. Next in time sequence is a second relatively short time duration signal area 17 that contains a second national advertisement that can be selectively preempted by a local-advertisement. A queue signal or tone 18 shown as separating the two national advertisement areas 16/17 signals or triggers that the second short time duration signal can be preempted. Notice, the order of the various program sequences is exemplary and many program orders are possible. Further, the typical advertisement signal is relatively short in comparison to the main program signal, but the advertisement could be relatively long also, such as an infomercial. Also, while the queue signal 18 is shown as a possible preemption to allow for local advertisement, the queue signal could allow for preemption of other broadcast features, such as the main program 15 could be preceded by a queue signal allowing the national program to be preempted by a local program (such as local sports for national sports, etc.)

More specifically, a scheduling computer 20 detects queue signal 18 and causes system 10 to preempt the national advertisement that is contained within second advertisement area 17. System 10 preempts the second advertisement area 17 with a local-advertisement that is stored within FIG. 1's advertisement storage facility 19 (which could be, for example, a digital storage of local-advertisements in hard drive storage at data rates of from about 6 to about 8 megabits per second). In other words, system 10 fetches local-advertisement from storage facility 19 and inserts the local-advertisement being fetched from advertisement storage facility 19 into the preempted space. In some cases, no local programming exists when queue signal 18 indicates the local station can preempt the national programming. In those cases, the broadcast, preemptable signal is transmitted. Thus, the following scenarios exist: no queue signal is present and the national broadcast is transmitted, a queue signal allows the local system to substitute a local program (which is a local advertisement in the above example) for the national program, or the local system transmits the national broadcast despite the existence of a queue signal. In some cases, the queue signal 18 may not be properly detected, which would cause the national broadcast to be transmitted instead of a local program.

After either the second national advertisement or selected local-advertisement has been presented to TV viewers by way of signal area 17, the succeeding relatively long time duration portion 15 of the TV program resumes playing. As a result, TV viewers first view TV program portion 15, then view national advertisement 16, then view either a national advertisement or a local-advertisement 17, and then view a second portion 15 of the TV program allowing for seamless preemption and insertion to viewers.

By way of a non-limiting example, the memory of scheduling computer 20 has been loaded to contain information relative to one or more business-related local programs 17, such as local advertisements, that are stored in storage facility 19. Typically local programs 17 are scheduled to run at particular times, a particular number of times, for particular viewers, etc.

While the invention will be described while making reference to a video/audio signal stream 14 such as is shown in FIG. 2, the spirit and scope of the invention is not to be limited to this specific utility. For example, the two signal portions 15 can be considered to be two portions of a primary signal stream that contains one or more secondary signal streams 16,17 that can be selectively preempted in order to insert or substitute one or more different secondary signal streams from a local store 19. Also, the signal stream has been generally described in cable TV systems, but would be equally useful in telephone systems, Internet broadcasts, satellite TV systems, etc.

Referring back to FIG. 1, antenna(s) 11 output national broadcast content from satellites to a plurality of analog satellite receivers $25_{1-n}$ and a plurality of digital satellite receivers $26_{1-m}$, each receiver having an input connected to the output 13 of satellite antenna(s) 11. As shown in FIG. 1, but only by way of example, one analog satellite receiver 25 is tuned to receive an analog channel such as CNBC and to present its analog video/audio output 27 as a first input to an analog inserter 28, while another analog satellite receiver 25 is tuned to receive a different analog channel such as TNT and to present its analog video/audio output 29 as a second input to analog inserter 28.

Scheduling computer 20 and inserter 28 monitor inputs 27 and 29 to analog inserter 28 for a number of reasons, one of which is to detect the presence of queue signal 18 in an input 27, 29. Within the spirit and scope of the invention, inserter 28 may detect queue signal 18 and then inform scheduling computer 20 that local programming, such as local advertisements, can be inserted in accordance with scheduling computer 20 programming.

In the case of local advertisement, scheduling computer 20 contains a list of local-advertisements that are to be presented within the geographic viewing area of system 10, as well as the number of times the local advertisement is to be presented within a given time period such as a 24-hour day, as well as the times of day during which a given local advertisement is to be played, and perhaps a specified type of main program into which a given local advertisement is to be inserted.

When a queue signal 18 is detected, scheduling computer 20 operates to fetch a designated local programming, such as local advertisement, from storage facility 19, whereupon this fetched programming is presented to analog inserter 28 at input 30. As a result of the operation of analog inserter 28, an analog signal stream as shown in FIG. 2 is presented as an input 32 to each of the two channel modulators 31, corresponding to each of the two inputs 27 and 29 that are presented to analog inserter 28. As a final step in the analog operation of system 10, the outputs 33 of channel modulators 31 are presented to the STTs 12a that are within system 10.

Also as shown in FIG. 1, but only by way of example, one digital satellite receiver 26 is tuned to receive digital signal stream, such as, for example, a MPEG signal stream. In the case of MPEG, the signal stream typically contains from 6 to 12 baseband video/audio digital TV programs (having a data rate of about 3 to 4 mega bits per second). The digital satellite receiver 26 transmits a digital variable bit rate (VBR) video/audio output 34 as a first input to a digital statistical multiplexer (STATMUX) 36. Another digital satellite receiver 26 is tuned to receive a different MPEG signal stream that contains from 6 to 12 digital TV programs. The digital satellite receiver 26 transmits a digital VBR video/audio output 35 as a second input to STATMUX 36.

When queue signal 18 is detected within the digital bit steams being applied as inputs to digital satellite receivers 26, scheduling computer 20 operates to fetch a designated local programming, such as local advertisement, storage facility 19. STATMUX 36 receives the fetched local programming at input 37. As a result of the operation of STATMUX 36, a digital signal stream as shown in FIG. 2 is presented as a VBR input 38 to a QAM channel modulator 39.

As is well known, STATMUX 36 uses discrete cosine transform (DCT) mathematical techniques to discard or throw-away picture bits that are within its VBR bit-stream inputs 34, 35, and 37 whenever local programming must be inserted in a digital program's data stream. At any given moment in time when a VBR bit stream 34, 35, 37 is depicting a scene having a large amount of motion, a large number of picture bits are required to depict this fast-moving scene. As a result the unit quantity of bits per second is quite variable in bit streams 34, 35, 37. As a result, this insertion operation can change the picture quality of the material that is presented to the TV viewers by way of the STTs 12d that are connected to the output 40 of QAM channel modulator 39.

STATMUX 36 makes bit-space for a fetched local program input 37 by analyzing bit stream 34 or 35 and then throwing away enough signal-bits to make space for local programming at input 37, including throwing away bits that are within the local programming itself. As a result, visual picture quality may be compromised by the operation of STATMUX 36.

In accordance with the present invention, signal parameters such as bit rate, the amount of DCT function coding, etc., are measured in order to quantify a fundamental characteristics of the digital signal at portion 17 of FIG. 2's signal at any given or desired moment in time. In addition, the digital signal at input 37 applied to STATMUX 36 may be applied to a quality analyzer such as the Picture Quality Analyzer (PQA 200) by Tektronix, and the data output of the quality analyzer can be used to provide a basic parameter for signal 17. Parametric measurement can be taken for elementary signal (ES) streams such as video, audio, etc. or parameter measurements can be taken for a combined program ES (PES) such as combined video and audio. Parameter measurement can be taken at regular time intervals, for example at cable system 10's TV frame rate, or at any other desired repeating unit of time, and the measurement time-series can be stored within a database for later use as a fingerprint wherein a data series forms a fingerprint or a photograph of the programming data stream, usually a digital programming data stream that is fetched from storage 19. This fingerprint or photograph is thereafter used for comparison to playback events of the programming that are within data streams 32 and 38.

While the information to develop the fingerprint described above considers parameters associated with cable TV systems, other parameters to develop fingerprints are possible. For example, Internet transmissions could use packet information to develop a fingerprint. Sampling of transmissions could also be used to verify data streams (the stream could be sampled at a first relay and a second relay and compared to ensure accurate data is being sent). In other words, a previous fingerprint developed either prior to transmission or at a previous point in the transmission of the data stream could be compared to a subsequent fingerprint developed either later during the transmission or at the reception of the signal.

A fingerprint-to-playback comparison enables accurate identification of the programming material that is presented to users, at for example STTs 12a and 12d, so that the accuracy of the execution of programming commands by scheduling computer 20 are verified. National broadcasts could also provide a fingerprint of national programming content to be verified. In the advertisement example, the national broadcaster could make a fingerprint of program segment 15 and compare the fingerprint to the actual broadcast program 15 to verify accurate transmission.

When data streams are preempted or overwritten with paid preemptive streams, it is desirous to verify the preemptive streams are in fact transmitted. Thus, the present invention is especially useful in the field of TV programming and advertisement insertion, the invention is not limited to this utility since the invention is useful for other verification functions, for example for the verification of the complete and accurate execution of any type of program, such as video on demand (VOD) commands, Internet data transmissions and the like. Of course, verification of the integrity of any data stream is desirous.

A way to very the data stream is to develop a fingerprint of the data stream or the portion of the data stream. The use of bit rate as a measured comparison parameter has particular utility in variable bit rate (VBR) digital TV presentation and/or to STATMUX playback systems where the invention provides a quantitative analysis that measures the amount or degree of change between an original program and/or AD-material and subsequent transmitted or playback bit rates.

As a feature of the invention, fingerprint data can be stored at various locations, local or remote. For example, in the advertisement example, the signal fingerprint can be stored at one or more STTs. The fingerprint stored in the STT is to verify program and/or advertisement delivery to the one or more specific STTs 12 as the invention's data stream analysis is performed.

Figure 3:
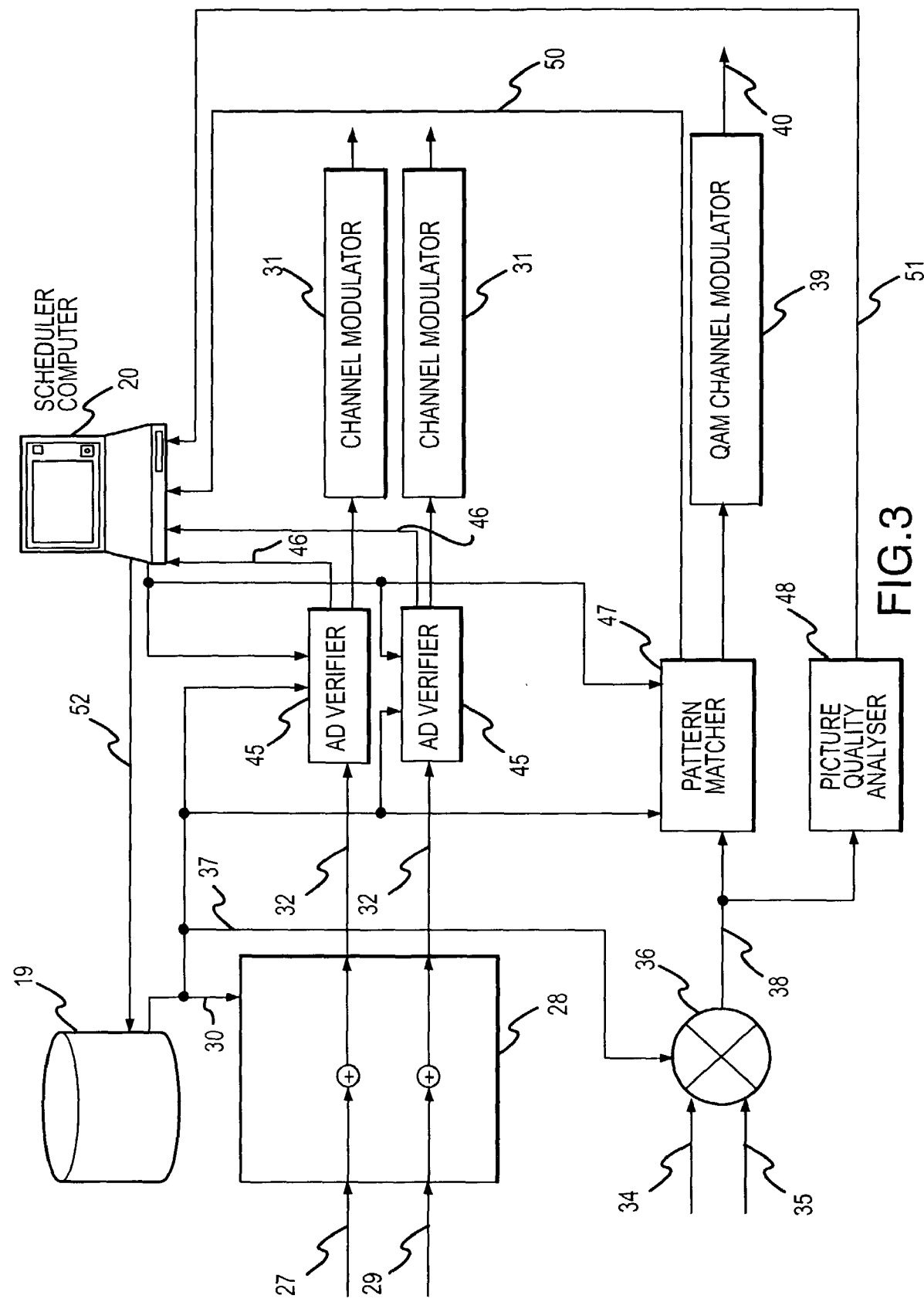
FIG. 3 is a functional block diagram consistent with aspects of the present invention.
Figure 4:
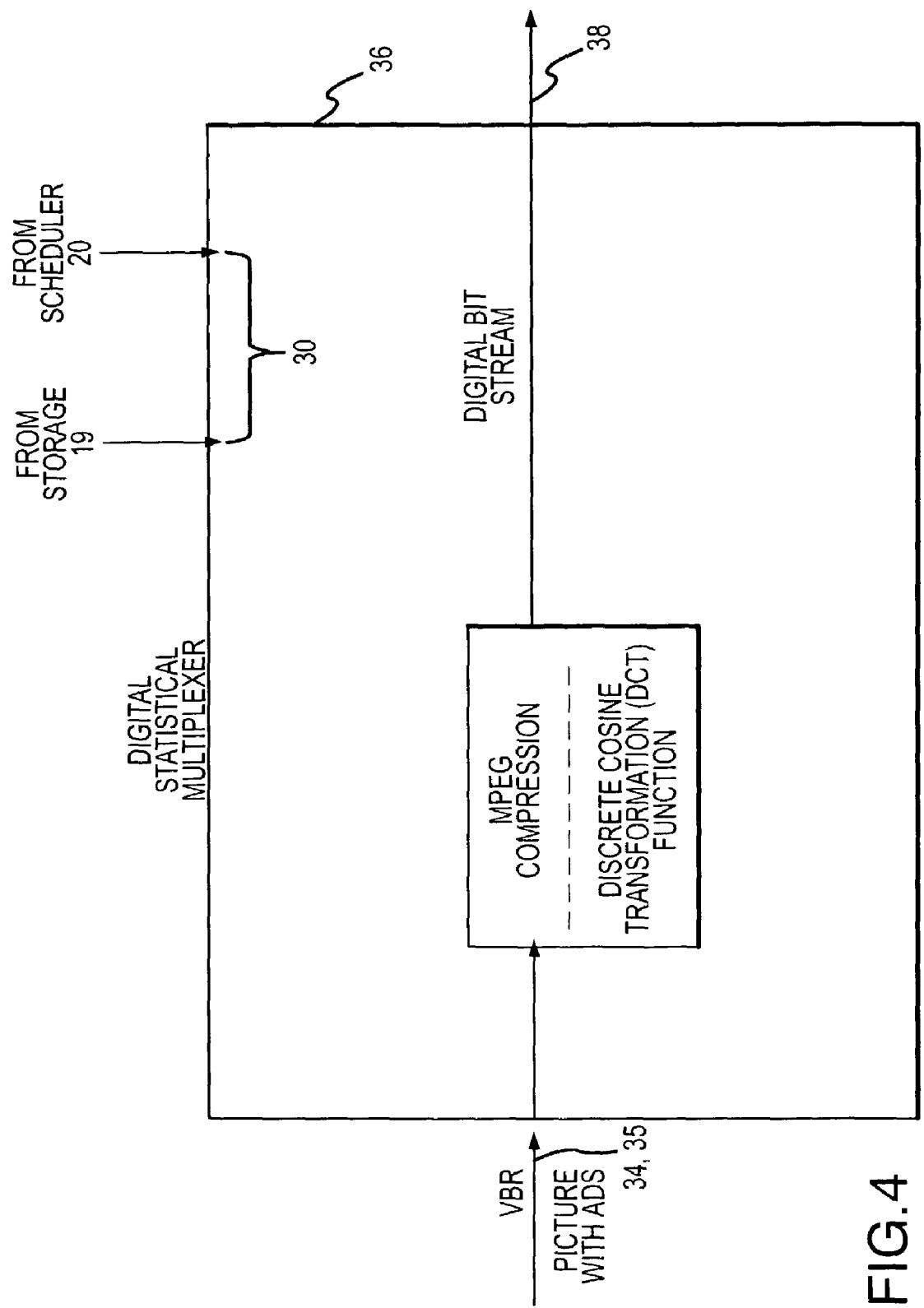
FIG. 4 shows portions of FIGS. 1 and 3 in more detail.

Referring to the above-described non-limiting example of advertisement insertion into a national broadcast is further explained with reference to FIGS. 3 and 4. FIGS. 3 and 4 show the present invention as it is applied to FIG. 1's cable system 10. More particularly, verification takes place relative to the local advertisement portion(s) of the output(s) 32 of FIG. 1's analog inserter 28, pattern matching takes place relative to the local advertisement portion(s) of the output(s) 38 of FIG. 1's digital STATMUX 36, and picture quality analysis takes place relative to the local advertisement portion(s) of the output(s) 38 of FIG. 1's digital STATMUX 36. Of course, a verification similar to the one described with respect to the verification of the local advertisement inserted into the broadcast stream is possible for any transmission, such as, the national broadcast absent insertion or preemption, telecommunication signals, wireless or satellite signals, Internet transmissions, etc.

As the terms verification and pattern matching are used herein, the terms mean any type of fingerprint-content or identification-content of an analog or digital data stream, with the particular example being related to the insertion of local advertisement that is transmitted by cable system 10 in response to queue signal 18, which fingerprint-content or identification-content is compared to a similar fingerprint-content or identification-content of the local advertisement that was fetched from storage 19 in response to queue signal 18. As such, the term fingerprint may be virtually any signal component that is common to both the fetched local advertisement and the transmitted local advertisement. More broadly, the fingerprint may be any signal component that is expected in a transmission that can be compared during or after transmission. For example, a facsimile transmission can create a fingerprint at the point of transmission and a fingerprint at the point of reception. The transmission fingerprint and the reception fingerprint can be compared to verify transmission.

Referring back to the advertisement example, FIG. 3 shows that a verifier 45 is provided for each output 32 from analog inserter 28, which output is then applied to FIG. 1's channel modulators 31. However, one or more verifiers 45 that are not connected to channel modulators 31 can also be used to accomplish the same result wherein a verification output 46 is applied as an input to scheduler computer 20.

FIG. 3 also shows that a pattern matching circuit or function 47 and a picture quality analyzer or function 48 are provided to receive the output 38 from STATMUX 36 and to apply this output to FIG. 1's QAM modulator 39, as a pattern matching output 51 is also applied as an input to scheduling computer 20. Again, one or more pattern matchers 47 can be provided in a manner wherein the outputs of the pattern matchers do not provide an input to QAM modulator 39. Pattern matching can occur at any point in the signal processing chain, including the very end (i.e., at the output of a STT 12.

In operation, the presence of queue signal 18 in FIG. 2's video/audio signal stream 14 operates to cause scheduling computer 20 to fetch a designated local advertisement from storage 19, by way of an output 52 from scheduling computer 20. Of course, as described above, output 52 occurs only when queue signal 18 occurs at such a time that a sold local advertisement can be inserted in accordance with criteria that is contained or stored within scheduling computer 20, for example, criteria such as the type of program 15 currently being broadcast to STTs 12, the time of day, etc.

Assuming that a local advertisement is fetched from storage 19 in response to queue signal 18 for insertion into 27 of analog inserter 28, a fingerprint of the fetched local advertisement is sent to the corresponding verifier 45. That particular verifier 45 now operates to compare this fingerprint with the actual fingerprint-content of the fetched local advertisement that is contained within the corresponding output 32 of the corresponding AD-verifier 45. When these two signal fingerprints match in accordance with criteria established by this particular verifier 45, then an output 46 from that verifier 45 informs scheduling computer 20 that the obligation to transmit the particular local advertisement from storage 19 to viewers at analog TV STTs 12a has been satisfactorily accomplished. Of course, when this transmission has not been accomplished to the satisfaction of that verifier 45, signal 46 informs scheduling computer 20 that the transmission of this particular local advertisement must be repeated at a later time in response to a later queue signal 18, or in the alternative no charge can be made for the unsuccessful transmission. Of course, one of skill in the art would recognize other types of error signals could be used in alternative transmission mediums.

Assuming now that a local advertisement is fetched from storage 19 in response to queue signal 18 for insertion into MPEG input 34 of STATMUX 36, a fingerprint of the fetched local advertisement is sent to pattern matcher 47. Pattern matcher 47 now operates to compare this fingerprint with the actual fingerprint-content of fetched local advertisement that is contained within the output 38 of STATMUX 36. When these two signal fingerprints match in accordance with criteria established by pattern matcher 47, then an output 50 from pattern matcher 47 informs scheduling computer 20 that the obligation to transmit the particular local advertisement from storage 19 to viewers at digital TV STTs 12d has been satisfactorily accomplished. Of course, when this transmission has not been accomplished to the satisfaction of pattern matcher 47, signal 50 informs scheduling computer 20 that the transmission of this particular local advertisement must be repeated at a later time in response to a later queue signal 18, or in the alternative no charge can be made for the unsuccessful transmission. Of course, one of skill in the art would recognize other types of error signals could be used in alternative transmission mediums.

In addition, picture quality analyzer 48 operates to analyze the picture quality of the output 38 of STATMUX 36, and should the picture quality of the local advertisement be unsatisfactory, output 51 informs scheduling computer 20 that the transmission of this particular local advertisement must be repeated at a later time in response to a later queue signal 18, or in the alternative no charge can be made for the unsuccessful transmission. Of course, one of skill in the art would recognize other types of error signals could be used in alternative transmission mediums.

As can be seen from the above detailed description, this invention provides for the automatic verification of the content of local advertisements that are broadcast in response to a queue signal 18 that is contained in an analog video/audio signal stream 14, and/or for the automatic verification of the content of local advertisement that are broadcast in response to a queue signal 18 that is contained in a digital video/audio signal stream 14. That is, it is not required that a person view local advertisements that are broadcast by TV sets in order to visually determine if a sold local advertisement has been transmitted in a manner that justifies charging for the transmission.

In summary, it can be seen that the present invention verifies the transmission of a relatively short time duration temporary signal stream, such as an advertisement, to television sets that are within a television system, wherein a main signal stream, such as a TV program that spans a rather long time period, is being transmitted to the television sets. This main signal stream contains a queue signal, or the like, indicating that the temporary signal stream may now be inserted into the main signal stream, whereupon the main stream is thereafter again transmitted to the television sets. When this queue signal is detected, the temporary signal stream is fetched from storage and transmitted to the television sets. The temporary signal stream is now monitored as it is transmitted to the television sets. A signal characteristic that is common to the fetched temporary signal stream and the transmitted temporary signal stream is compared, and an output indicates the success/failure of the transmission of the temporary-signal stream to the television sets based upon this comparison.

Because it is known that others skilled in the art will, upon learning of this invention, readily visualize other embodiments of the invention that are within the spirit and scope of the invention, the above detailed description is not to be taken as a limitation on the spirit and scope of the invention. In addition, the above detailed description is not to be taken as a limitation on existing equivalents and after-developed equivalents of the present invention.

While the invention has been particularly shown and described with reference to an embodiment thereof, it will be understood by those skilled in the art that various other changes in the form and details may be made without departing from the spirit and scope of the invention.

We claim:

1. A computer implemented method for verifying the transmission of a data stream, comprising the steps of:
    determining an expected transmission time when a first data stream is expected to be transmitted and a corresponding non-expected transmission time when the first data stream is not expected to be transmitted;
    storing, in a memory, prior to the expected transmission time, a first fingerprint that corresponds to the first data stream;
    generating a second fingerprint of a data stream that is transmitted during the expected transmission time and not generating the second fingerprint during the non-expected transmission time;
    comparing the first fingerprint stored in the memory and the second fingerprint; and
    sending an error signal if the compared first fingerprint and second fingerprint fail to match within predetermined parameters, the error signal indicating that the first data stream was not properly transmitted during the expected transmission time.

2. The method according to claim 1, further comprising the steps of:
    receiving the transmitted data stream; and
    generating the second fingerprint after the transmitted data stream is received.

3. The method according to claim 1, wherein the data stream is transmitted over a cable TV system, a telecommunications system, a wireless system, a satellite system, and a computer network.

4. The method according to claim 3, wherein the computer network is a local area network, a wide area network, the Internet, or the world wide web.

5. The method according to claim 1, further comprising the step of generating the first fingerprint.

6. The method according to claim 2, wherein the first fingerprint is stored prior to transmission.

7. The method according to claim 1, further comprising the step of:
    replacing at least a portion of the transmitted data stream with a transmitted, preemptive data stream.

8. The method according to claim 7, wherein the first fingerprint is of the preemptive data stream and the second fingerprint is of the transmitted, preemptive data stream.

9. The method according to claim 7, further comprising the steps of:
    storing a preemptive data stream fingerprint;
    generating a transmitted, preemptive data stream fingerprint that corresponds to a fingerprint of a data stream transmitted when the preemptive data stream is to be transmitted; and
    comparing the preemptive data stream fingerprint to the transmitted, preemptive data stream fingerprint;
    wherein the error signal sending step also sends the error signal when the preemptive data stream fingerprint and the transmitted, preemptive data stream fingerprint fail to match within predetermined parameters.

10. The method according to claim 9, wherein the error signal sending step indicates whether comparison failed for the data stream or the preemptive data stream.

11. A method for automatically verifying the transmission of a temporary-signal stream to television sets attached to a television system, comprising the steps of:
    storing a temporary-signal stream;
    storing a first signal characteristic of the temporary-signal stream;
    transmitting a main-signal stream to at least one television set;
    determining an expected transmission time when the temporary-signal stream is expected to be transmitted and a corresponding non-expected transmission time when the temporary-signal stream is not expected to be transmitted;
    detecting a queue signal;
    fetching the temporary-signal stream from storage when the queue signal is detected;
    preempting the transmitting of the main-signal stream when the temporary signal stream is fetched;
    transmitting the temporary-signal stream to the at least one television set when the main-signal stream is preempted;
    monitoring the temporary signal stream during the expected transmission time, and not monitoring the main-signal or temporary-signal stream during the non-expected transmission time;
    determining a second signal characteristic of the monitored temporary signal stream;
    comparing the first and second signal characteristic; and
    generating a first output indicating a success or failure of the transmission of the temporary-signal stream to the television sets based upon the comparison.

12. The method according to claim 11, further comprising the step of viewing the at least one television set.

13. The method according to claim 11, wherein the main-signal stream and the temporary-signal stream comprise video/audio picture streams.

14. The method according to claim 13, wherein the temporary-signal stream comprises an advertisement, and wherein the main-signal stream is a program that can be interrupted for insertion of the advertisement.

15. The method according to claim 11, wherein the main-signal stream and the temporary-signal stream are digital video/audio picture streams, and including the steps of:
    analyzing a picture quality of the temporary-signal stream transmitted to the at least one television set; and
    generating a second output indicating a success or failure of the transmission of the temporary-signal stream to the at least one television set based upon the analyzed picture quality.

16. An apparatus for verifying the transmission of a data stream, comprising:
    at least one memory;
    at least one data stream fingerprint generator;
    at least one comparator;
    at least one error generator, wherein
    the at least one memory stores an expected transmission time when the temporary-signal stream is expected to be transmitted, a corresponding non-expected transmission time corresponding to when the temporary-signal stream is not expected to be transmitted;
    the at least one memory stores a previous fingerprint of a first data stream prior to the expected transmission time of the first data stream;
    the at least one data stream fingerprint generator generates a subsequent fingerprint from a data stream that is transmitted during the expected transmission time and does not generate a subsequent fingerprint during the non-expected transmission time;
    the at least one comparator compares the previous fingerprint to the subsequent fingerprint; and
    the at least one error generator generates an error signal when the previous fingerprint fails to match the subsequent fingerprint within predetermined parameters to indicate that the first data stream was not properly transmitted during the expected transmission time.

17. The apparatus according to claim 16, wherein at least one of the at least one memory, the at least one fingerprint generator, the at least one comparator, and the at least one error generator are located locally.

18. The apparatus according to claim 16, wherein at least one of the at least one memory, the at least one fingerprint generator, the at least one comparator, and the at least one error generator are located remotely.

19. The apparatus according to claim 16, further comprising: at least one receiver adapted to receive the transmitted data stream.

20. The apparatus according to claim 16, further comprising at least one network to transmit the data stream.

21. The apparatus according to claim 20, wherein the at least one network is at least one of a local area network, a wide area network, the Internet, the World Wide Web, a cable TV network, a telecommunications network, a wireless network, or a satellite network.

22. The apparatus according to claim 16, further comprising:
at least one inserter; and
the at least one inserter replaces at least a portion of the data stream with at least one preemptive data stream.

23. The apparatus according to claim 22, wherein the previous fingerprint stored in memory corresponds to the preemptive data stream and the data stream fingerprint generator generates the subsequent fingerprint from the transmitted, preemptive data stream.

24. The apparatus according to claim 22, wherein:
a preemptive data stream fingerprint is stored in the at least one memory; and wherein,
the at least one data stream fingerprint generator generates a transmitted, preemptive data stream fingerprint;
the at least one comparator compares the stored preemptive data stream fingerprint and the transmitted, preemptive data stream fingerprint; and
the at least one error signal generator generates an error signal when the preemptive data stream fingerprint and the transmitted, preemptive data stream fingerprint fail to match within predetermined parameters.

25. The apparatus according to claim 24, wherein the at least one error signal generator indicates whether the comparison failed for the data stream or the preemptive data stream.

26. An apparatus for verifying the transmission of a temporary-signal stream to television sets attached to a television system, comprising:
at least one memory
at least one temporary-signal stream stored in the at least one memory;
an expected transmission time stored in the at least one memory, the expected transmission time corresponding to when the temporary-signal stream is expected to be transmitted, a corresponding non-expected transmission time corresponding to when the temporary-signal stream is not expected to be transmitted;
a signal characteristic of the temporary-signal stream stored in the at least one memory;
at least one transmitter for broadcasting at least one main-signal stream to at least one television set;
at least one detector for detecting whether at least one queue signal exists in the at least one main-signal stream;
at least one processor; wherein
the at least one processor fetches the at least one temporary-signal stream for the at least one memory when the at least one detector detects the at least one queue signal;
the at least one processor transmits the at least one temporary-signal stream and suspends the transmission of the at least one main-signal stream to the at least one television set;
at least one monitor;
the at least one monitor monitors the transmission of the at least one temporary-signal stream during the expected transmission time, and does not monitor the main-signal or temporary-signal stream during the non-expected transmission time;
at least one comparator; wherein
the at least one comparator compares the stored signal characteristic of the temporary-signal; stream to a signal characteristic of the monitored transmission; and
the processor generating at least one error signal based on the compared signal characteristic, the error signal indicating whether the temporary-signal stream was properly transmitted.

27. The apparatus according to claim 26, wherein the at least one main-signal stream and the at least one temporary-signal stream comprise at least one of video/audio picture streams.

28. The apparatus according to claim 26, wherein the at least one processor analyzes a picture quality of at least one of the at least one temporary-signal streams and generates the at least one error signal when the analyzed picture quality is determined to be below a predetermined quality threshold.

29. The apparatus according to claim 26, wherein the at least one temporary-signal stream is a plurality of temporary-signal streams and the at least one processor determines a particular temporary-signal stream to fetch based on predetermined scheduling parameters.

30. A computer program product comprising:
a non-transitory computer usable medium including computer readable code embodied therein for verifying a data stream transmission, the computer usable medium comprising:
at least one memory module configured to store an expected transmission time corresponding to when a first data stream is expected to be transmitted, a corresponding non-expected transmission time corresponding to when the first data stream is not expected to be transmitted;
the at least one memory module further configured to store, before the expected transmission, at least one fingerprint of the first data stream that is to be transmitted;
at least one fingerprint generator module configured to generate a fingerprint of a transmitted data stream during the expected transmission time and not generate a fingerprint of the transmitted data stream during the non-expected transmission time;
at least one comparator module configured to compare the stored fingerprint and the generated fingerprint; and
at least one error module configured to generate an error signal when the stored fingerprint and the generated fingerprint fail to match within predetermined parameters, the error signal indicating that the first data stream was not properly transmitted.

31. The computer program product according to claim 30, further comprising:
at least one receiving module configured to receive the transmitted data stream.

32. The computer program product according to claim 30, wherein the at least one memory module, the at least one fingerprint generator module, the at least one comparator module, and the at least one error module are running on a plurality of processors.

33. The computer program product according to claim 30, further comprising:

an insertion module configured to replace at least a portion of a data stream with a preemptive data stream.

34. The computer program product according to claim 33, wherein the at least one previous fingerprint stored in the at least one memory module corresponds to the preemptive data stream; and
the at least one fingerprint generator module generates the generated fingerprint from the transmitted, preemptive data stream.

35. The computer program product according to claim 33, wherein
the at least one memory module is further configured to store a preemptive fingerprint;
the at least one fingerprint generator module is further configured to generate a transmitted, preemptive fingerprint;
the at least one comparator module is further configured to compare the preemptive fingerprint to the transmitted, preemptive fingerprint; and
the at least one error module is further configured to generate an error signal when the preemptive fingerprint and the transmitted, preemptive fingerprint fail to match.

36. The computer program product according to claim 34, wherein the at least one error module is further configured to identify whether the comparison failed for the data stream or the preemptive data stream.

37. An apparatus for verifying the transmission of a data stream:
means for storing at least one previous fingerprint of a first data stream before an expected transmission time of the first data stream;
means for determining an expected transmission time when the temporary-signal stream is expected to be transmitted and a corresponding non-expected transmission time when the temporary-signal stream is not expected to be transmitted;
means for generating a subsequent fingerprint from a data stream transmitted during the expected transmission time and not generating the subsequent fingerprint during the non-expected transmission time;
means for comparing the previous fingerprint to the subsequent fingerprint; and
means for generating an error signal when the previous fingerprint and subsequent fingerprint fail to match within predetermined parameters, the error signal indicating that the first data stream was not properly transmitted.

38. The apparatus according to claim 37, wherein at least one of the means for storing, the means for generating, the means for comparing, and means for generating an error signal are located locally.

39. The apparatus according to claim 37, wherein at least one of the means for storing, the means for generating, the means for comparing, and means for generating an error signal are located remotely.

40. The apparatus according to claim 37, further comprising:
means for receiving the transmitted data stream.

41. The apparatus according to claim 37, further comprising means for transmitting the data stream.

42. The apparatus according to claim 41, wherein the means for transmitting the data stream comprises at least one of a local area network, a wide area network, the Internet, the World Wide Web, a cable TV network, a telecommunications network, a wireless network, or a satellite network.

43. The apparatus according to claim 37, further comprising:
means for inserting a preemptive data stream into the transmitted data stream.

44. An apparatus for verifying the transmission of a temporary-signal stream to television sets attached to a television system, comprising:
means for storing at least one temporary-signal stream;
means for storing a first signal characteristic of the temporary-signal stream,
means for storing an expected transmission time corresponding to when a temporary-signal stream is expected to be transmitted, a corresponding non-expected transmission time corresponding to when the temporary-signal stream is not expected to be transmitted;
means for broadcasting at least one main-signal stream to at least one means for viewing the broadcast;
means for detecting a queue signal in the at least one main-signal stream;
means for fetching the at least one temporary-signal stream from the means for storing when the means for detecting detects the queue signal;
means for transmitting the fetched temporary-signal stream to the at least one means for viewing;
means for suspending the transmission of the at least one main-signal stream to the at least one means for viewing when the fetched temporary-signal stream is being transmitted;
means for monitoring the transmitted temporary-signal stream during the expected transmission time, and not monitoring the main-signal or temporary-signal stream during the non-expected transmission time;
means for determining a second signal characteristic of the monitored temporary signal stream;
means for comparing the first and second signal characteristics; and
means for generating an error signal based on the compared signal characteristics, the error signal indicating whether the temporary-signal stream was not properly transmitted.

45. The apparatus according to claim 44, further comprising
means for analyzing a picture quality of the transmitted temporary-signal stream; and the means for generating the error signal generates the error signal when the analyzed picture quality is determined to be below a predetermined quality threshold.

46. The apparatus according to claim 44, further comprising:
means for scheduling the at least one temporary-signal stream such that the means for fetching fetches the at least one temporary-signal stream scheduled by the means for scheduling.

* * * * *